United States Patent
Wu

(10) Patent No.: US 7,177,997 B2
(45) Date of Patent: Feb. 13, 2007

(54) COMMUNICATION BUS SYSTEM

(75) Inventor: Zong Liang Wu, San Diego, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 288 days.

(21) Appl. No.: 10/497,048

(22) PCT Filed: Nov. 20, 2002

(86) PCT No.: PCT/IB02/04866

§ 371 (c)(1),
(2), (4) Date: May 28, 2004

(87) PCT Pub. No.: WO03/048950

PCT Pub. Date: Jun. 12, 2003

(65) Prior Publication Data

US 2005/0086411 A1   Apr. 21, 2005

(30) Foreign Application Priority Data

Dec. 3, 2001  (EP) .............................. 012046645

(51) Int. Cl.
*G06F 12/00* (2006.01)
(52) U.S. Cl. ...................................................... 711/167
(58) Field of Classification Search ................ 711/167; 710/35
See application file for complete search history.

(56) References Cited

U.S. PATENT DOCUMENTS

| | | | | |
|---|---|---|---|---|
| 5,361,261 A * | 11/1994 | Edem et al. | ................. | 370/445 |
| 5,544,324 A * | 8/1996 | Edem et al. | ................. | 709/231 |
| 5,559,796 A * | 9/1996 | Edem et al. | ................. | 370/412 |
| 5,566,169 A * | 10/1996 | Rangan et al. | ............... | 370/366 |
| 5,594,734 A * | 1/1997 | Worsley et al. | ........ | 370/395.53 |
| 5,960,001 A * | 9/1999 | Shaffer et al. | ............... | 370/448 |
| 6,101,613 A * | 8/2000 | Garney et al. | ............... | 713/600 |
| 6,339,584 B1 * | 1/2002 | Gross et al. | ................. | 370/225 |
| 6,578,109 B1 * | 6/2003 | Stone et al. | ................. | 711/118 |
| 6,658,515 B1 * | 12/2003 | Larson et al. | ............... | 710/260 |
| 6,981,073 B2 * | 12/2005 | Wang et al. | .................. | 710/28 |
| 2002/0065966 A1 * | 5/2002 | Brief | .......................... | 710/100 |
| 2002/0174299 A1 * | 11/2002 | Hayter et al. | ............... | 711/118 |

* cited by examiner

*Primary Examiner*—Matthew Kim
*Assistant Examiner*—Ryan A. Dare

(57) ABSTRACT

The bus controller of a bus system supports isochronous messages and non-isochronous messages for which the bus system does and does not support a guaranteed transceiving capacity per time-frame respectively. The system has a first and second memory section for exchange of data from the isochronous messages between a processor and the bus controller. The bus controller has access priority over the processor in alternating first and second ones of the time frames. The bus controller transfers data from isochronous messages between the bus medium and the first and second memory section in the first and second ones of the time frames respectively. The processor has access priority to the first and second memory section over the bus controller in the second and first ones of the time frames respectively. The system contains a third memory section for exchange of data from the non-isochronous messages, a relative access priority of the processor and bus-controller to the third memory section being unchanged in all time frames.

5 Claims, 3 Drawing Sheets

Figure 1:
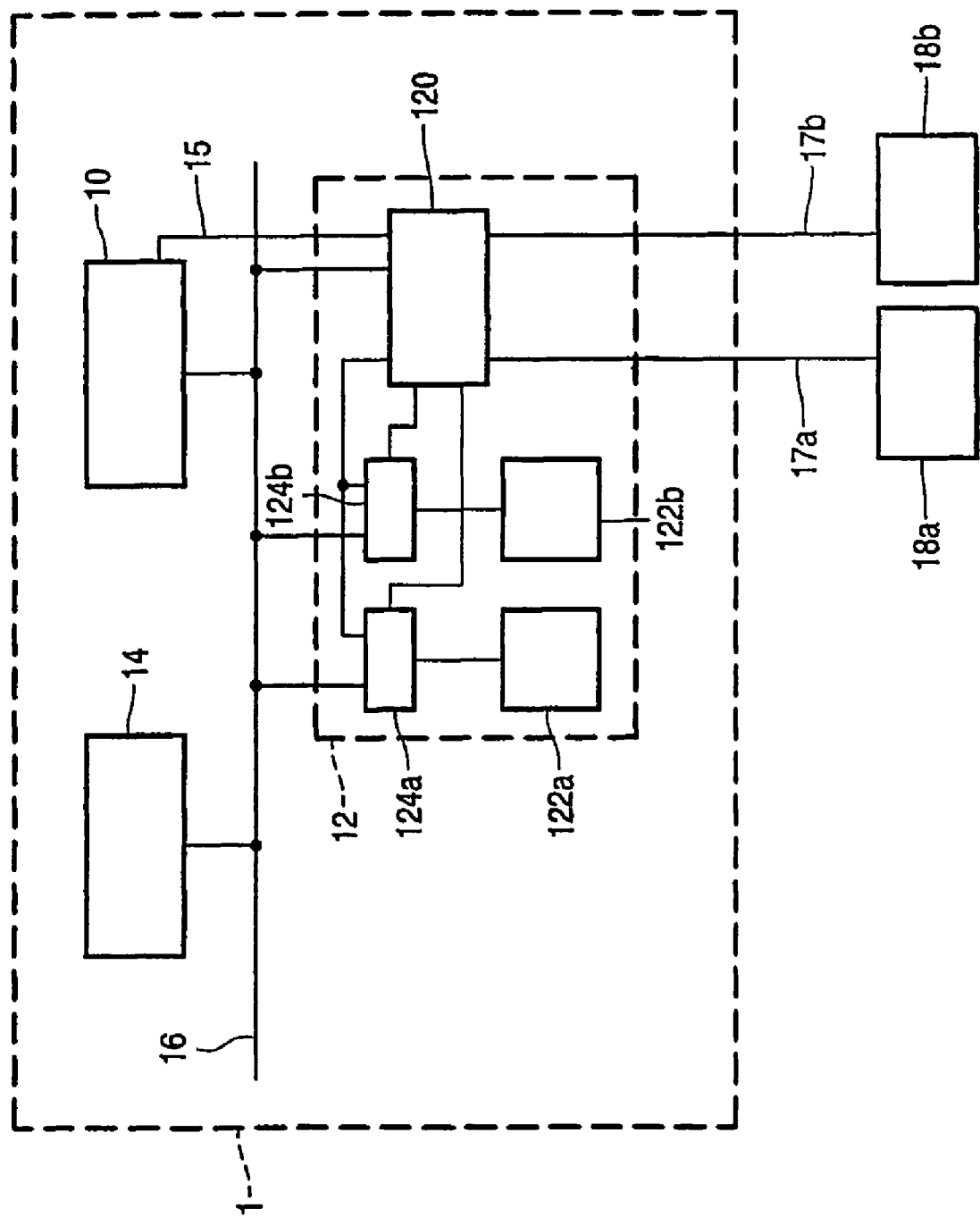

| 7 | 6 | 5 | 4 | 3 | 2 | 1 | 0 |
|---|---|---|---|---|---|---|---|
| ISO | Speed | Direction PID | | EndpointNumber | | | |
| FunctionAddress | | | | | | | |
| MaxPacketSize (9:2) | | | | | | MaxPacketS (1:0) | |
| TotalBytes (9:4) | | | | | | TotalBytes (3:0) | |
| ActualBytes (9:6) | | | ActualBytes (5:0) | | | | |
| Active | Error | | | ErrorCode | | | |
| Reserved | | | | | | | |

FIG. 3

COMMUNICATION BUS SYSTEM

The invention relates to a communication bus system like a USB system.

Nowadays the USB (Universal Serial Bus) is frequently used in PC's (Personal Computers). The USB provides for transfer of data over a bus medium that is made up of USB cables. A PC serves as USB host and is connected on one side to these cables. USB devices are connected to the other side of the cables, possibly via hubs. In the PC, the USB functionality is implemented in a host controller HC which communicates with the system processor and other system resources via an internal system bus. Normally, the host controller and the processor communicate via a memory. The host controller writes data received from the bus medium into a memory or reads data that has to be transmitted from the memory. The processor reads or writes this data into the memory. Obviously, the host controller cannot transmit data before the processor has generated this data and written it into memory. Similarly the host processor will have to process received data quickly enough to ensure that the memory does not overflow with unprocessed received data.

USB provides for transfer of isochronous and non-isochronous messages over the bus medium. Isochronous messages concern for example real time data, such as voice or audio signals and their transfer has to meet real time constraints. A guaranteed transfer bandwidth has to be available. This is implemented in successive time frames. The host controller ensures that a guaranteed amount of data can be transferred in isochronous packets in each time frame. That is, in case the host controller has to transmit isochronous messages, the host controller has to have the data available in time (usually in a memory), or the host controller has to have memory available to store incoming data in case of received isochronous messages. Transmission and reception of non-isochronous messages can be delayed until resources become available.

Conventionally, the host controller is made master of the system bus to ensure that it has access to memory in time when it needs to write or read data of isochronous messages. This is no problem if the processor and the bus are very fast and powerful, which is usually the case in PC's. However, in case of less powerful processors, such as for example in low cost hand held devices like mobile telephones, palmtop PC's etc. that can operate as a USB host, the host controller may impose too high a load on the internal bus, leaving to little time for the processor to process the data, or to perform other (not bus related) functions, needed in a mobile telephone for example.

Amongst others, it is an object of the invention to provide for an architecture for a processing system that can handle isochronous message as well as non-isochronous messages in such a way that not too little time is left for processing by the processor.

The communication bus system according to the invention is set forth in claim 1. According to the invention the system comprises different memory sections for isochronous and non-isochronous messages. The host controller and the processor can access different ones of the memory sections in parallel without hindering each other. Arbitration is needed if they attempt to access the same memory section in parallel. To ensure unhindered transfer of isochronous messages at least two memory sections are provided for isochronous messages. In successive time frames the host controller is given highest priority access to a alternating ones of these memory sections. The processor is given highest priority access to the other (or other ones) of these memory sections in each time frame.

Highest priority access may be ensured in many ways, for example by means of exclusive access, denying any access to one of the host controller or processor when it is indicated that the other one has high priority access. Alternatively, an arbitration mechanism may be used that arbitrates each memory transaction individually.

A further memory section is provided for the non-isochronous messages. Both the host controller and the processor have access to this further memory. Their relative access priority to this memory does not change from one time-frame to another. By way of example priority is determined by means of arbitration between the host controller and the processor to determine who gets access to this memory section. By providing a separate memory section for non-isochronous messages, the special memory sections for isochronous messages can be kept small.

In an embodiment the system is interrupt based, the host controller sending interrupts to the processor when it has finished transfer of messages for a time-frame. Thus, the processor is enabled to start access to the first or second memory section after the host controller has completed transfer of messages, even if the time-frame is not yet finished.

In a further embodiment isochronous messages are transferred first and separate interrupts are generated upon completion of transfer of the isochronous messages and upon completion of transfer of the non-isochronous messages. Thus, the processor is enabled to start access to the first or second memory section even during the time-frame in which the host processor has highest access priority to that memory section after completion of transfer of isochronous messages, but before completion of transfer of all messages.

These and other advantageous aspects of the bus system according to the invention will be described in more detail using the following figures.

Figure 2:
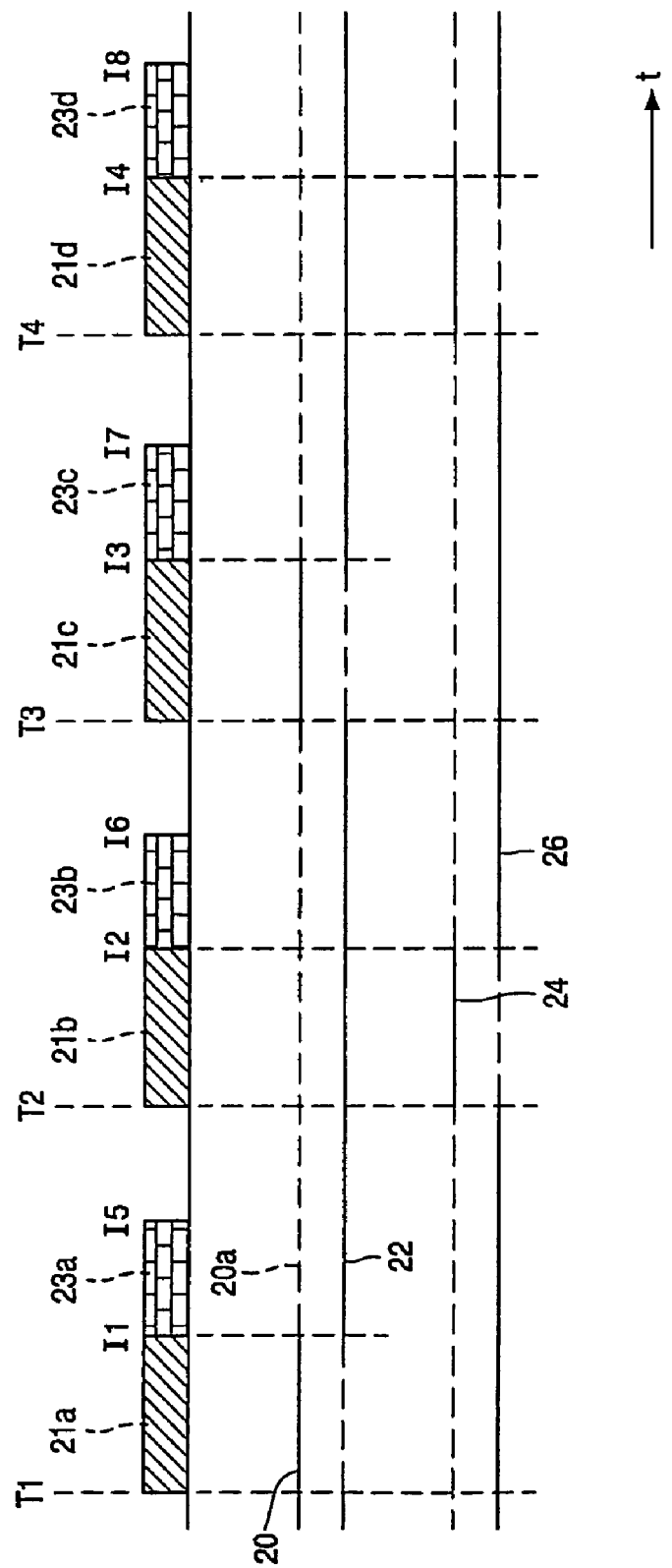

FIG. 1 shows a bus system
FIG. 2 shows a sequence of time frames
FIG. 3 shows a transaction descriptor FIG. 1 shows a USB system. The system contains a USB host 1, USB connections 17a,b and USB devices 18a,b. The USB host 1 contains a processor 10, a bus control unit 12, a common memory 14, all connected via an internal bus 16. The bus control unit 12 contains a host controller 120, a first memory 122a, a second memory 122b, a first access control unit 124a and a second access control unit 124b. The first and second memory 122a,b are coupled to the internal bus 16 via first and second access control unit 124a,b respectively, via a first access port of each of these access control units 124a,b.

The host controller 120 is connected to the USB connections 17a,b. Furthermore, the host controller 120 is connected to the internal bus 16, to a control input of the first and second access control unit 124a,b and to the first and second memory 122a,b via second ports of the first and second access control unit 124a,b. The host controller 120 has an interrupt line 15 coupled to processor 10.

In operation the system transfers messages to and from USB devices 18a,b via USB connections 17a,b. Data from the messages is produced or consumed by processor 10. In case data has to be sent to a USB device 18a,b processor 10 writes this data into one of the common memory 14 or first or second memory 122a,b (directly or using DMA). Host controller 120 reads this data from the relevant memory 14, 122a,b, encapsulates the data in a message and sends the message to an addressed device 18a,b via a USB connection 17a,b. Similarly, when a message has to be received from a USB device 18a,b, host controller 120 writes data from each message in one of the common memory 14 or the first and second memory 122a,b. In this case processor 10 subsequently reads this data from the relevant memory 14, 122a,b (directly or using DMA).

Access to the common memory 14 via internal bus is conventional, using for example an arbiter (not shown), or under control of processor 10. Access to the first and second memory 122a,b is controlled by access control units 124a,b. Both access control units 124a,b have a first and a second mode of operation. In the first mode the access control unit 124a,b gives access to the corresponding memory 122a,b via the internal bus, via the first port of access control unit 124a,b. This may be normal address mapped access. In the second mode the access control unit 124a,b gives host controller 120 access to the corresponding memory 122a,b. The mode is selected by host controller 120 via the control inputs of the access control units 124a,b.

Host controller 120 operates in successive time-frames. In each time frame host controller 120 reserves a certain amount of time for transmission of isochronous messages. Isochronous messages serve to guarantee that real time signals can be transmitted on time via USB connections 17a,b. When a program executing in processor 10 wants to transmit a real time signal, it determines how much transmission time will be needed per frame for this signal and requests that host controller 120 reserves that amount of time in each time frame. If not too much time has already been reserved host controller 120 grants the request (if not, the program cannot start the signal). In this way it is ensured that sufficient data can be transmitted in each frame for signals for which host controller 120 has granted a request.

FIG. 2 illustrates operation of the system as a function of time "t". Time is divided in successive time-frames (shown starting at times T1–4). In each time frame a time interval 21a–d occurs in which isochronous messages are transmitted, followed by a time interval 23a–d in which other, non-isochronous messages are transmitted. The length of these time intervals 21a–d, 23a–d may vary from frame to frame, depending on the actual amount of data that has to be transferred. As shown, some of the time-frame may be left unused for transmission. This is not necessarily so; it also depends on the actual amount of data that needs to be transferred.

FIG. 2 shows, in addition, four lines representing, successively from top to bottom access to the first memory 122a by the host controller 120, access to the first memory 122a by the processor 10, access to the second memory 122b by the host controller 120, access to the second memory 122b by the processor 10. Right of access is shown by a solid line, lack of that right is shown by dashed lines.

In successive time frames host controller 120 seizes access to alternate ones of the first and second memory 122a,b, for the duration of the time interval 21a–d for transfer of data from isochronous messages. That is, in the time intervals 21a,c of the odd (first and third) time-frames (starting with T1, T3) host controller 120 seizes access to the first memory 122a and in the time intervals 21b,d of the even (second and fourth) time frames (starting with T2, T4) host controller 120 seizes control of the second memory 122b. During the time interval 21a–d for transfer of isochronous messages host controller 120 writes or reads data to or from the memory 122a,b to which it has seized control. This data is taken from received isochronous messages or put into transmitted isochronous messages.

Processor 10 has access to each of the first and second memory 122a,b via internal bus 16 when host controller 120 has not seized control of the relevant memory 122a,b. Thus, processor 10 at least has access to each particular memory 122a,b during the time-frame before the time frame in which host controller reads data from that memory 122a,b for use in isochronous messages and in the time frame after the time-frame in which host controller 120 writes data from isochronous messages into that memory. This gives processor 10 the opportunity to write or read that data in one time frame and it gives host controller 120 the opportunity to receive and transmit isochronous messages without delay in another time frame.

At the time I1–I4 when host controller 120 has finished receiving or transmitting isochronous messages in a time-frame, host controller 120 relinquishes access to the first or second memory 122a,b used for that receiving or transmitting. Thus, processor 10 gets the opportunity in the remainder of the time frame to write or read that memory 122a,b. Of course, this opportunity continues into the next time frame, since host controller 120 will read or write from the other memory 122a,b in that time frame. In total therefore processor 10 gets an interval of more than a whole time-frame to read or write data for isochronous transmission.

In FIG. 2 for example, host controller 120 seizes access to the first memory 122a during the first time-frame in interval 20 from the start time T1 of the time frame to the time I1 at the end of isochronous message transfer. After that time I1 host controller 120 relinquishes access in a time interval (shown as a dashed line 20a) until the start T3 of the third time frame. From time I1 to the start T3 of the third time-frame (interval of solid line 22) processor 10 has the opportunity to access the first memory 122a. Similarly host controller 120 seizes access to the second memory 122b during the second time-frame in interval 24 from the start time T2 of the time frame to the time I2 at the end of isochronous message transfer. After that time I2 host controller 120 relinquishes access in a time interval until the start T4 of the fourth time frame. From time I2 to the start time T4 of the fourth time-frame (interval 26) processor 10 has the opportunity to access the second memory 122a.

After the time I1–4 of completion of transfer of isochronous messages non-isochronous messages are transferred, using data from common memory 14, until a time I5–8 when no data is left or the time-frame ends. Host controller 120 normally contends with processor 10 for access to the internal bus 16 to access common memory 14. Therefore, if host controller 120 loses access to processor 10, transfer of data for non-isochronous messages may have to be delayed.

Host controller 120 generates two interrupts for processor 10 per time frame, a first one at the time I1–4 when isochronous message transfer has been completed and a second one at the time I5–8 when non-isochronous transfer has been completed. The first interrupt signals that processor 10 gets back the opportunity to access that one of the first and second memory 122a,b that the host controller 120 has used for isochronous data transfer in the current time frame. This enables the processor 10 to read or write data to that memory 122a,b for the rest of that time frame and for the next time frame. Thus the processor 10 gets maximum opportunity to transfer data to or from the memory 122a,b.

The second interrupt (at time I5–8) signals that host controller 120 has completed non-isochronous data transfer in the time frame. This enables processor 10 to adapt the data transfer to time intervals that lead to minimum interference with host controller 120.

FIG. 3 shows the format of a transaction descriptor for USB message transfer. Processor 10 loads data descriptors with this format into the memories 122a,b, 14 to signal the need for message transfer to host controller 120. The descriptor is followed by memory space for the data that is transferred. It will be noted that the descriptor is not necessarily limited to one message (also called "packet" in USB): the descriptor describes a block of data that host controller 120 may send or receive in one or more message. The meaning of the various fields in the descriptor and whether they are read or written by host controller (column "Access") is illustrated in the following table.

TABLE

| Name | Access | Description |
| --- | --- | --- |
| ISO | R | indicates type of message |
| Speed | R | indicates speed of message |
| DirectionPID | R | direction of data flow: in/out or setup (two-way) |
| EndpointNumber | R | USB address of destination endpoint within function |
| FunctionAddress | R | USB address of destination function |
| Toggle | R/W | Toggled after each successful transfer |
| MaximumPacketSize | R | maximum number of bytes per message |
| TotalBytes | R | Total number of bytes described by descriptor |
| Active | R/W | Enable bit for host controller/completion bit for processor |
| Error | R/W | error indicator of transfer |
| ErrorCode | R/W | type of error |
| ActualBytes | R/W | number of bytes transferred |

Host controller 120 reads information from the descriptor, transmits or receives data according to the descriptor and writes back status information into the descriptor. Depending on whether a USB message is sent or received host controller 120 reads or writes the data following the descriptor.

Preferably, host controller 120 visits the descriptors stored in memory 122a,b sequentially during each frame and transmits or receives a message for each descriptor for which the "Active" bit is set. When all data for the descriptor has been transferred, host controller 120 clears the "Active" bit. When the host controller has transferred messages for all descriptors in a time frame and there is still time left, host controller 120 visits the descriptors again and transfers messages for those descriptors where the "Active" bit has not yet been cleared. Thus, a maximum amount of data can be transferred in a time-frame.

It will be understood that the embodiment described thus far is but one of the embodiments of the invention. For example, without deviating from the invention data for one or more non-isochronous message may be stored in the first or second memory 122a,b in addition to the data for the isochronous messages if there is room for this data. Of course this may limit transfer of this data to even or odd time frames if host controller 120 does not manage to transfer all data in one time frame. In another example, host controller 120 may have an additional memory for buffering the data that is actually transferred, this data being fetched from memory 122a,b, 14 or stored in the memory 122a,b, 14 before or after completion of the message respectively. The processor 10 may have a cache memory to store some of the data temporarily, the data from the cache being transferred when this is allowed by the host controller 120. DMA may be used to transfer data to and from the memories 122a,b, 14. Instead of bus addressed memory 122a,b special function registers in the processor may be used to access one or more of the memories.

The invention claimed is:

1. A communication bus system comprising:
   a bus medium (16);
   a bus controller (120) that is arranged to transmit and/or receive messages via the bus medium (16) in successive time frames, the bus controller (120) supporting isochronous messages and non-isochronous messages for which the bus system does and does not support a guaranteed transceiving capacity per time-frame respectively;
   a processor (10);
   a first and second memory section (122a,b) for exchange of data from the isochronous messages between the processor (10) and the bus controller (120), the bus system being arranged to give the bus controller (120) access priority over the processor (10) in first and second ones of the time frames respectively, the first and second ones of the time-frames alternating with one another, the bus controller (120) transferring data from isochronous messages between the bus medium (16) and the first and second memory section (122a,b) in the first and second ones of the time frames respectively, the processor (10) having access priority to the first and second memory section (122a, b) over the bus controller (120) in the second and first ones of the time frames respectively;
   a third memory section (14) for exchange of data from the non-isochronous messages, a relative access priority of the processor (10) and bus-controller (120) to the third memory section (14) being unchanged in all time frames.

2. A communication bus system according to claim 1, wherein the bus controller (120) has an interrupt output and the processor (10) has an interrupt input coupled to the interrupt output, the bus controller (120) being arranged to send an interrupt to the processor (10) upon completion of data transfer using the first and second memory section (122a,b) in the first and second time frames respectively.

3. A communication bus system according to claim 2, wherein the bus controller (120) is arranged to transfer the data between the bus medium (16) and the first or second memory section (122a,b) in each time frame before transferring data between the bus medium (16) and the third memory section (14), the bus controller (160) being arranged to send a further interrupt upon completion of data transfer using the third memory section (14) in each time frame.

4. A communication bus system according to claim 3, wherein the processor (10) is programmed to start reading or writing the data in the first and second memory section (122a,b) in response to the interrupt in the first and second time frame respectively.

5. A communication bus interface circuit (12) comprising:
   an interface for connecting a bus medium (16);
   a bus controller (120) that is arranged to transmit and/or receive messages via the interface in successive time frames, the bus controller (120) supporting isochronous messages and non-isochronous messages for which the bus interface circuit does and does not support a guaranteed transceiving capacity per time-frame respectively,
   an interface for a processor (10);

a first and second memory section (122a,b) for exchange of data from the isochronous messages between the processor (10) and the bus controller (120), the bus interface circuit (12) being arranged to give the bus controller (120) access priority over the processor (10) in first and second ones of the time frames respectively, the first and second ones of the time frames alternating with one another, the bus controller (120) transferring data from isochronous messages between the interface for the bus medium (16) and the first and second memory section (122a,b) in the first and second ones of the time frames respectively, the interface for the processor having access priority to the first and second memory section (122a,b) over the bus controller (120) in the second and first ones of the time frames respectively;

an interface to a third memory section (14) for exchange of data from the non-isochronous messages, a relative access priority of the interface for the processor (10) and bus-controller (120) to the third memory section being unchanged in all time frames.

* * * * *